Figure 7:
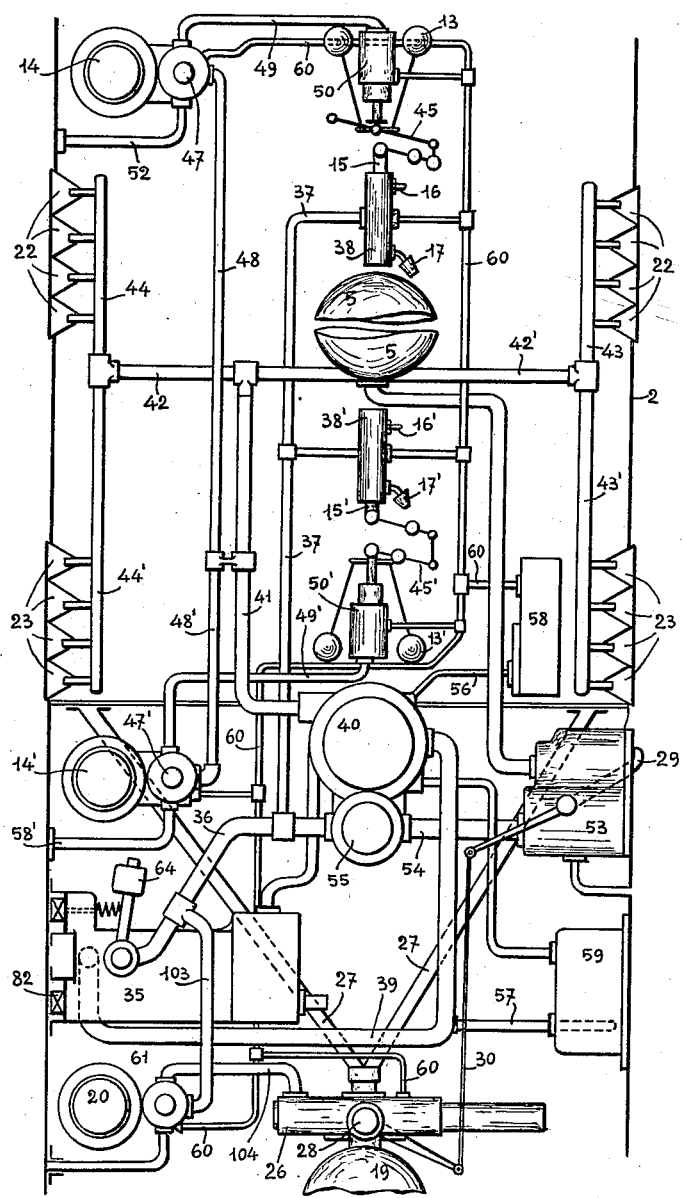

Sept. 29, 1931.  L. A. SACCO  1,825,161
TORPEDO
Filed March 9, 1929   10 Sheets-Sheet 1
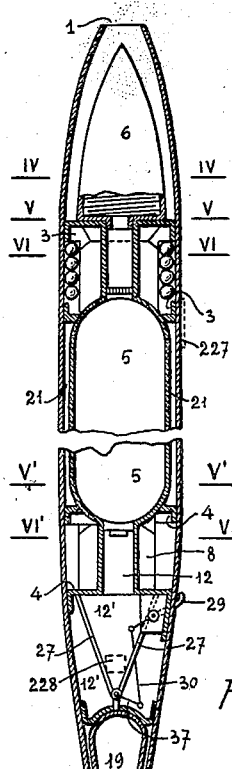
Fig. 1.
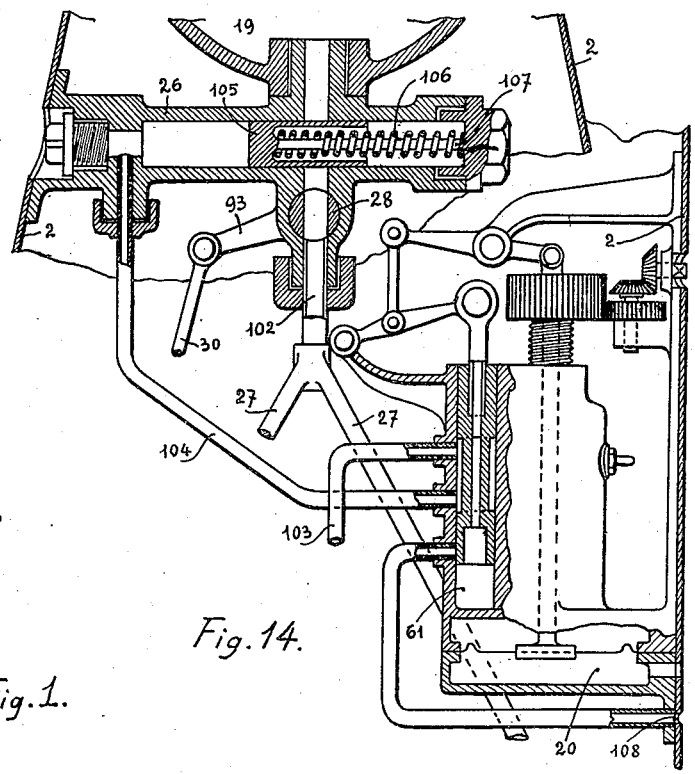
Fig. 14.
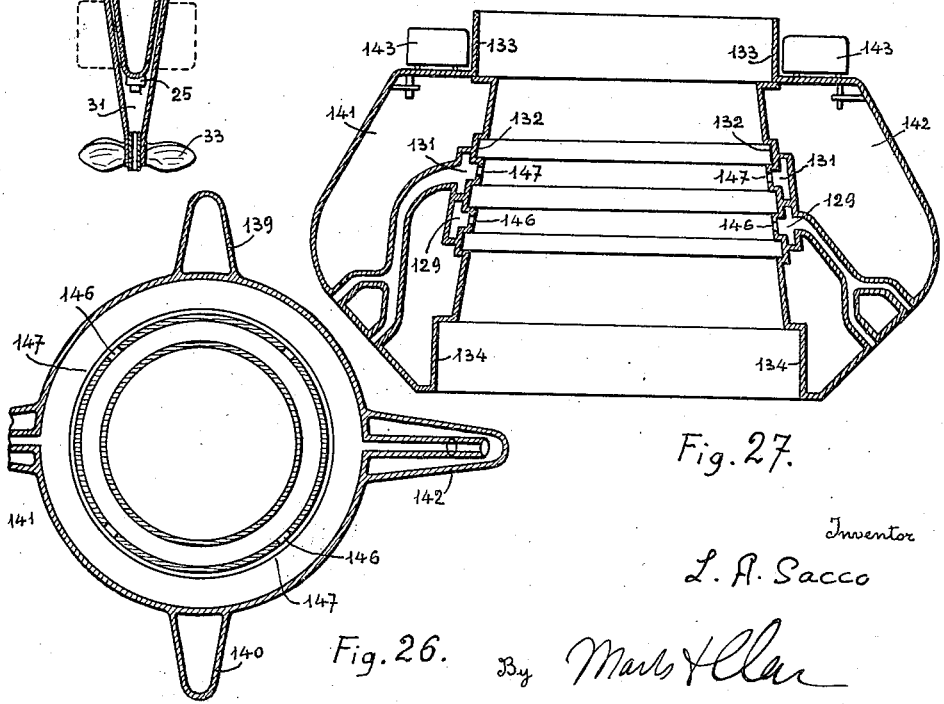
Fig. 27.
Fig. 26.
Inventor
L. A. Sacco
By Marks & Clerk
Attorney

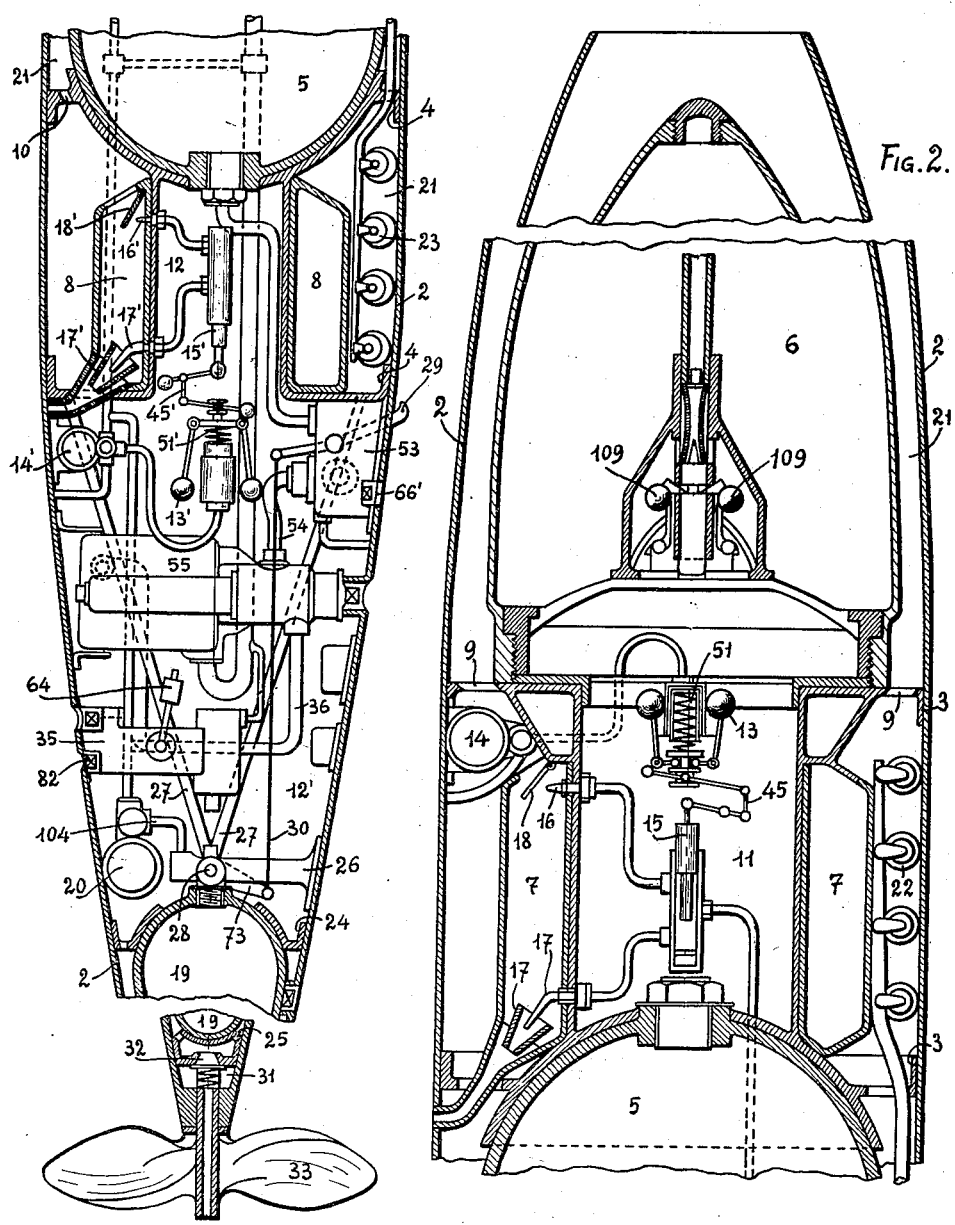

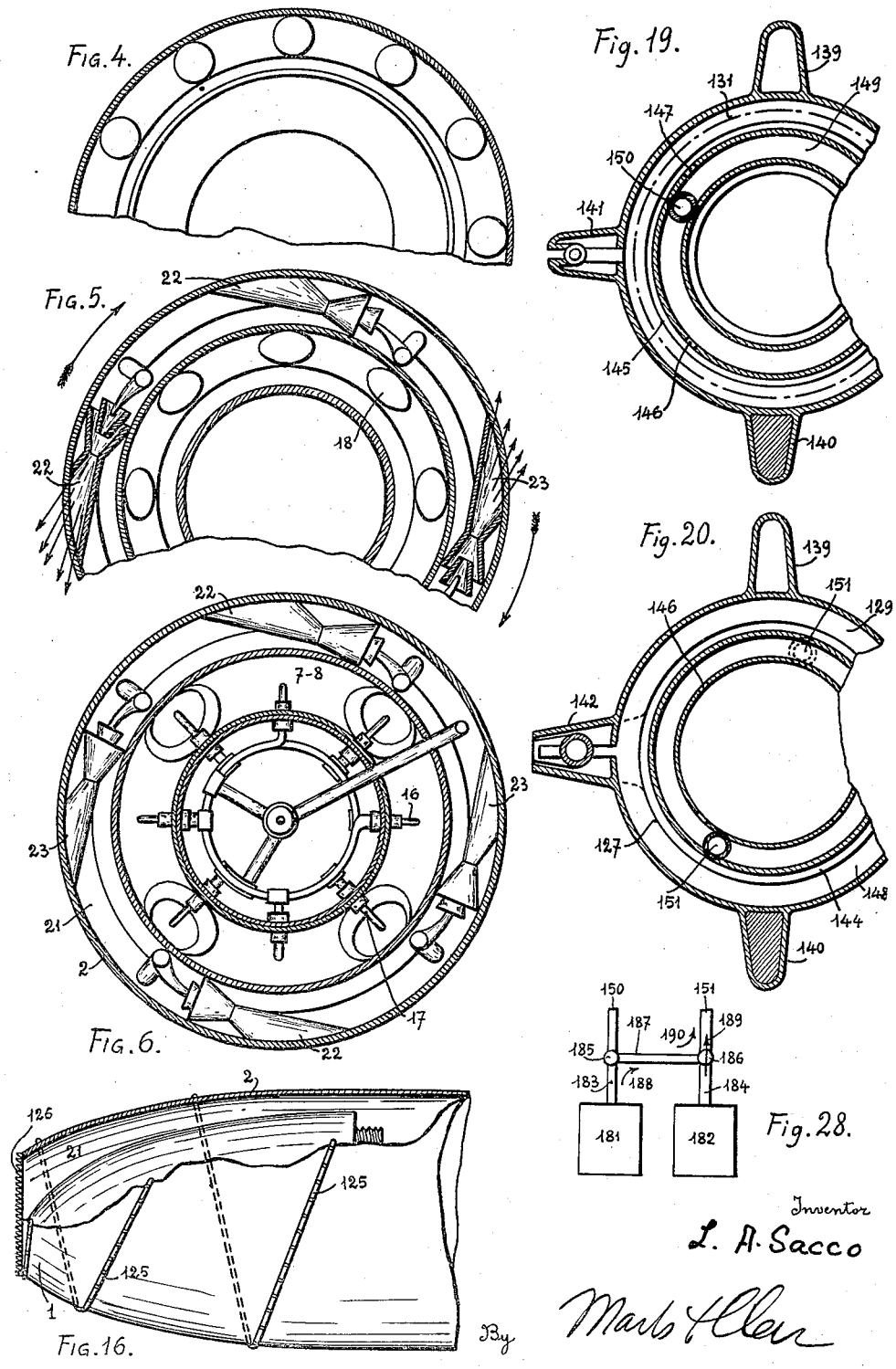

Sept. 29, 1931. L. A. SACCO 1,825,161
TORPEDO
Filed March 9, 1929 10 Sheets-Sheet 4

Inventor
L. A. Sacco
By Marks & Clerk
Attorney

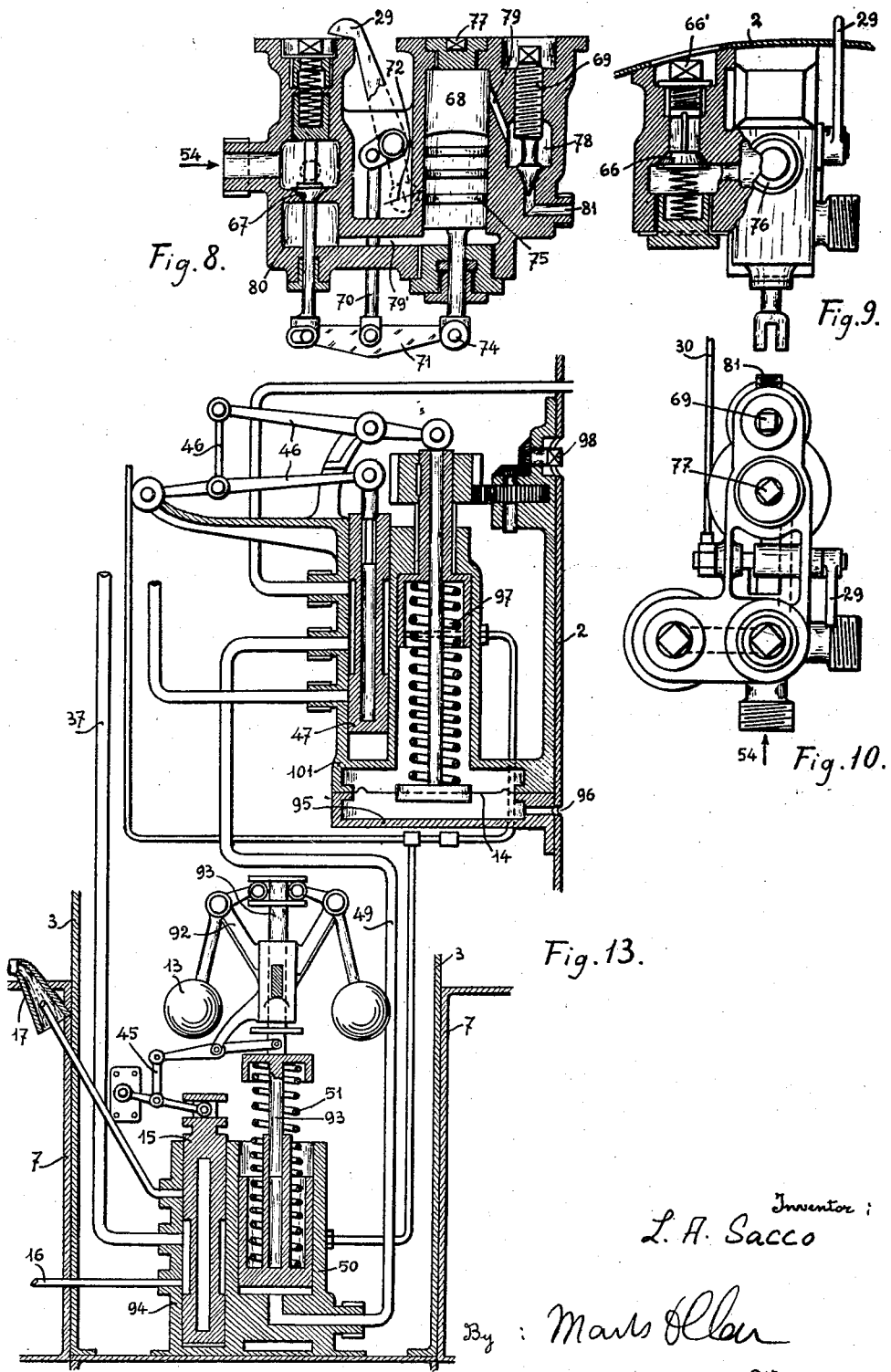

Sept. 29, 1931.  L. A. SACCO  1,825,161
TORPEDO
Filed March 9, 1929  10 Sheets-Sheet 6

Inventor
L. A. Sacco
By Marks & Clar
Attorney

Sept. 29, 1931. L. A. SACCO 1,825,161
TORPEDO
Filed March 9, 1929   10 Sheets-Sheet 7

Inventor
L. A. Sacco
By Marks&Clerk
Attorney

Sept. 29, 1931. L. A. SACCO 1,825,161

TORPEDO

Filed March 9, 1929 10 Sheets-Sheet 8

Inventor
L. A. Sacco
By Marks & Clerk
Attorney

Sept. 29, 1931.  L. A. SACCO  1,825,161
TORPEDO
Filed March 9, 1929   10 Sheets-Sheet 9

Inventor
L. A. Sacco
By Marks & Clerk
Attorney

Sept. 29, 1931. L. A. SACCO 1,825,161
TORPEDO
Filed March 9, 1929 10 Sheets-Sheet 10
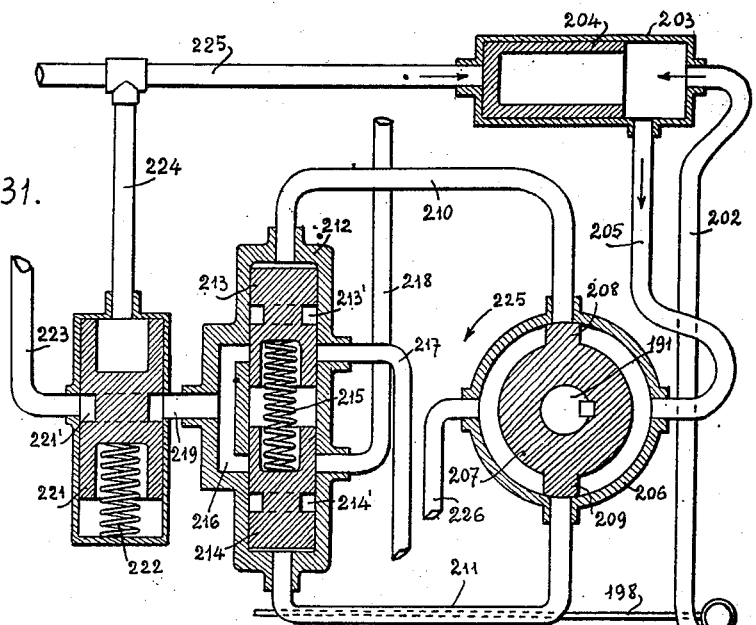
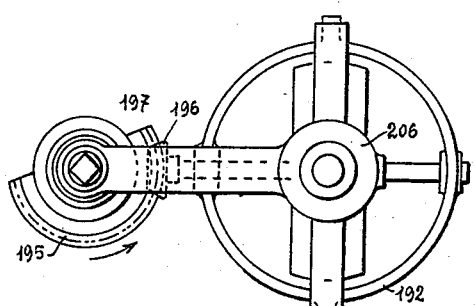
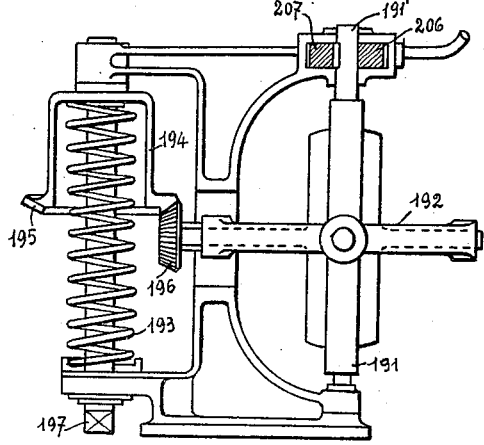

Patented Sept. 29, 1931

1,825,161

UNITED STATES PATENT OFFICE

LUIGI ARNALDO SACCO, OF GENOA, ITALY

TORPEDO

Application filed March 9, 1929, Serial No. 345,808, and in Great Britain March 9, 1928.

This invention relates to a locomotive torpedo contrived to receive a rotatory movement and to exercise a thrust upon the medium in which it is immersed.

An object of the invention is to provide a torpedo of simple construction and operation.

The above object is obtained by eliminating the propulsion motor at present fitted in torpedoes, eliminating, if desired, the rudders, both vertical (for steering) and horizontal (for regulating the depth of immersion and maintenance of balance) and eliminating the usual gyroscopic device and subsidiary apparatus.

The torpedo of the present invention is contrived to rotate upon its own axis, and is provided with a stern propeller which rotates together with the body.

The rotation of the torpedo produces the same effect as the usual gyroscopic device and also effects propulsion of the torpedo.

To effect rotation of the torpedo, the energy of a compressed fluid is utilized, said fluid being released through suitable apertures at the periphery of the torpedo body, and on its exit acting upon the medium in which the torpedo is immersed, reacting on the torpedo in a direction skew to its axis and setting up a rotation couple, whereby the torpedo and therewith the propeller are rotated and the requisite axial thrust obtained.

The invention contemplates the indirect utilization of the energy of the pressure fluid where such fluid is in the form of a gas under pressure, for example, compressed air. In such case compressed air is used to energize an ejector so as to set in motion a mass of water inside the torpedo and to expel it through the apertures in the torpedo body, it being understood that as the density of water exceeds that of the gaseous fluid, the reactive effort will be proportionally greater.

The invention also contemplates the provision of means which render unnecessary the necessity to impart to the water set in motion by the compressed air the total velocity which it should have relatively to the torpedo to effect the required reaction when projected into the fluid in which the torpedo is immersed. To this end there is utilized the same water as that in which the torpedo is immersed, such water being admitted at the nose of the torpedo. In this way, while the supply of water for propulsion is simplified, there is also realized the advantage of reduced headway resistance when the torpedo is in motion.

The invention further contemplates the provision of improved devices incorporated within the torpedo to maintain it horizontal during motion, to effect firing of the explosive charge, to regulate the distance travelled, to retard the release of the compressed air for propulsion until after the torpedo is launched, and means whereby the torpedo is caused to return to the surface at the end of its course during practice.

In detail, the device for maintaining the axis of the torpedo horizontal and retaining it at a given depth of submersion comprises one or more centrifugal governors co-operating with hydrostatic plates fitted at the nose and at the stern of the torpedo, said governor or governors serving to control valves whereby to fill or empty, partially or totally, suitable tanks installed within the torpedo in such positions as to obtain variations in the trim in a plane perpendicular to the axis of the torpedo.

To effect ignition of the explosive charge, there is used a centrifugal governor, which, only after the torpedo is launched and is being propelled on its course, releases the percussion rod so that said rod is free to strike the percussion cap when a resisting body is departed as distinguished from a yielding body such as a torpedo net.

The distance regulator provides for the passage of a liquid such as oil from one receptacle to another and the regulation of the size of the passage so that the time required for the liquid to pass will be in a given relation to the distance to be travelled.

The retarder which determines the moment at which release of the compressed air for effecting propulsion is initiated is based on a like principle to that underlying the device for regulating the distance travelled.

The means whereby the torpedo is caused to return to the surface during practice involves the use of an auxiliary compressed air chamber which, when the torpedo has arrived at a given depth, by means of a hydrostatic device acting in dependence on the pressure of the water surrounding the torpedo permits the compressed air from the auxiliary air vessel to invade certain compartments, expel the water therein and so lighten the torpedo, allowing it to rise to the surface again.

This device is also contrived to function to bring the torpedo to the surface when the main air vessel supplying the air for propulsion becomes exhausted.

The torpedo may be adapted to be launched from a ship, from an airship, aeroplane or hydroplane.

As the further improvement I arrange at a suitable distance from the centre of gravity of the torpedo body a device, which is preferably, but not necessarily located towards the stern which may function to steer the torpedo in an horizontal plane, that is exercises an action corresponding to that of the usual steering rudder of the torpedo.

The said device, is not only applicable to a torpedo such as above described; that is to a torpedo which can be worked by a water jet driven by an air jet, but can also be applied to torpedoes of existing types, having the advantage over modern rudders that it has varied action, that is, it can cause the torpedo to travel in a path composed of a suitable combination of straight paths and curved paths, the lengths of the straight paths and the curvature and the length of the curved paths being registrable before the jet, in such a manner that the torpedo be obliged to run a predetermined way.

The object of the present invention for the most complete case, that is, in which the above mentioned device is applied to revolving torpedo has been put in practice by setting before hand a ring provided with means so that, in operation, said ring is restrained against rotation, the torpedo meanwhile revolving freely. Said ring is provided with wings certain of which contain either air jets or water-air-jets. To obtain water tightness between the rotating torpedo body (from which comes the air under pressure) and the non-rotating ring above mentioned, there are provided between the ring and the torpedo a series of grease receiving chambers filled up with heavy grease. The ring and the torpedo body threat are ported and so that compressed air is supplied from chambers in the body to the wings containing the air jets or the water-air-jets. Said jets act upon the surrounding water mass, reacting upon the mass of the torpedo. To avoid that the push determined by said jets produces a lateral displacement of the axis of the torpedo, the jets can be directed obliquely respectively to the said axis, in such manner that the intersection of the driving lines of the forces with the axis be disposed nearer the stern and eventually upon a point of the axis behind the screw.

Each steering wing and each set of jets (of which there are two sets, both upon the horizontal level, one to the right hand and one to the left hand of the torpedo), is provided with a group of devices, which is regulatable from the outside and causes the jet to function after a fixed time from the moment of launching, and a sliding valve, which, after the said time, allows, during a predetermined time, the efflux of air under pressure to one of the steering wings, said efflux being also regulatable from the exterior of the torpedo before launching. The device which controls the feeding of air to one of the steering wings is also provided with a suitable regulator (reducer) of the pressure adapted to control the intensity of the air jet, and thus vary the curvature of the path of the torpedo. The whole is then provided with a group of regulating cocks which are conveniently operable from the outside and may allow regulation of the whole in such manner that one or other wing alone be active eventually at intervals, or the one, and after, the other.

To make the torpedo complete it would be advisable to provide it with a gyroscopic device. The vertical axis of the torpedo is maintained vertical by means of the same device which establishes the position of the steering wings. By means of the gyroscopic device the torpedo is caused to rotate around its vertical axis in such cases when for unforeseen external reasons it has received a rotatory movement around this axis as, for example, when the torpedo, plunging into the water or rising to the surface meets with or is struck by a wave. Said gyroscopic device has been arranged so as to at the start put a system of valves into motion which in turn, bring the steering wings into action, until the torpedo has regained its correct position. After this, the system ceases to operate and the previously described, other devices of the torpedo come into function.

Figures 11, 12:
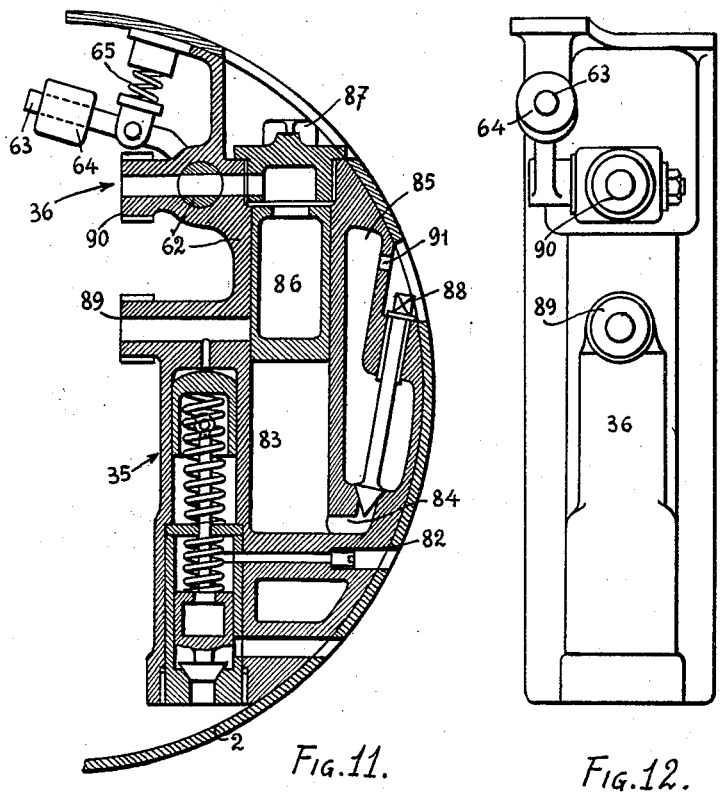
Figure 15:
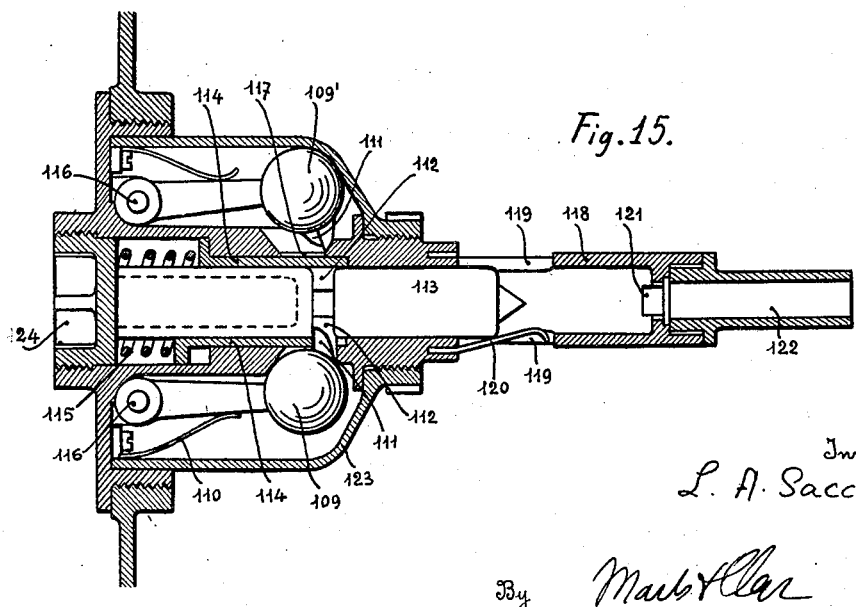

In the drawings Fig. 1 is a diagrammatic axial section showing the internal structure of the torpedo; Fig. 2 is a fragmentary longitudinal section drawn to a larger scale of the forward part of the torpedo, showing in particular the percussion rod (striker), the arrangement of the water tank nozzles, propulsion ejectors, and water tanks for depth regulation and for maintaining the torpedo in a horizontal position; Fig. 3 is a fragmentary longitudinal section drawn to a larger scale than Fig. 1 of the after part of the torpedo and showing in particular the rear water and the governing device thereof, subsidiary contrivances situated in a water-tight compartment placed aft of the ejector section, the auxiliary air vessel for floating the torpedo to the surface, and a propeller mounted upon the body of the torpedo. Fig. 4 is a transverse section substantially on the line IV—IV of Figs. 1 and 2 illustrating certain details of the forward bulkhead which serves as a support for the torpedo head and for the main air vessel; Fig. 5 is a transverse section substantially on the line V—V of Figs. 1 and 2 or on the line V'—V' of Figs. 1 and 3 showing the propulsion ejectors and the annular water tank and water inlet valves; Fig. 6 is a transverse section substantially on the line VI—VI of Figs. 1 and 2 or on the line VI'—VI' of Figs. 1 and 3 showing particularly the annular water tank and the arrangement of the nozzles for emptying or filling said tank; Fig. 7 is a diagram showing the assembly of the propulsion ejectors and associated devices, the main and auxiliary compressed air vessels, the oil tank and air heating apparatus, the register lever and the devices actuated thereby; Figs. 8, 9 and 10 show the distance regulator device which is associated with register lever, Fig. 8 being a section on the line VIII—VIII of Fig. 10, Fig. 9 a part section part elevation on the line IX—IX of Fig. 10; Fig. 10 a plan view; Figs. 11 and 12 show the retarding and speed governing device and the device for submerging the torpedo, Fig. 11 being a section on the line XI—XI of Fig. 12, and Fig. 12 an elevation looking on Fig. 11 in the direction indicated by the arrow XII (Fig. 11); Fig. 13 is a diagrammatic view showing the assembly of devices for regulating the depth and effecting balancing of the torpedo; Fig. 14 is a diagrammatic view showing an intercepting valve combined with the hydrostatic apparatus for controlling the auxiliary air vessel; Fig. 15 is a view showing the arrangement of the percussion striker in a modified form compared with that shown in Fig. 2; Fig. 16 is a fragmentary view showing devices fitted to the nose of the torpedo for cutting torpedo nets.

Figure 17:
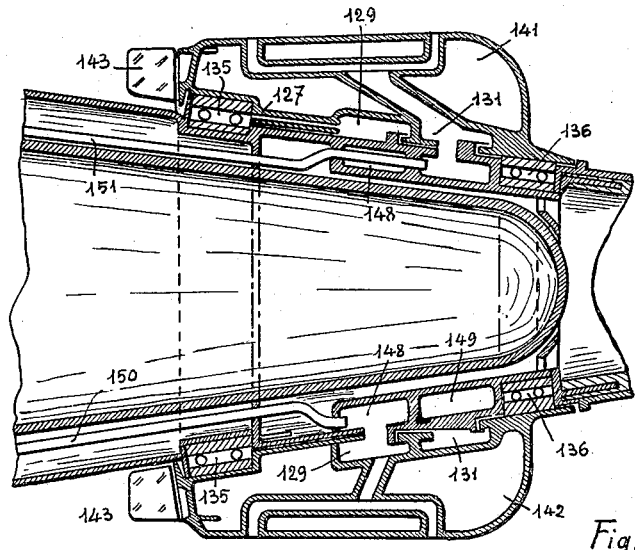
Figure 18:
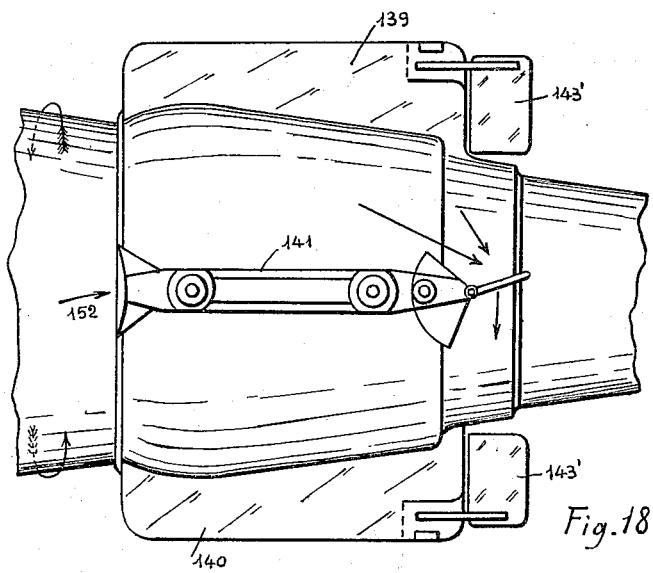
Figures 21, 22:
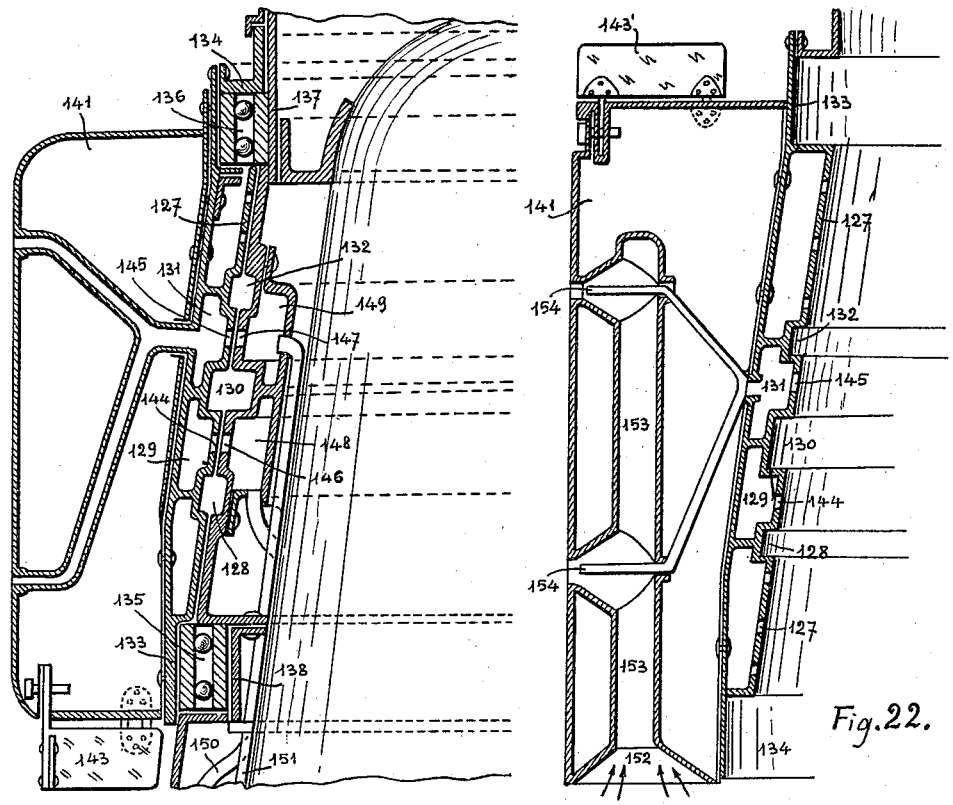
Figure 23:
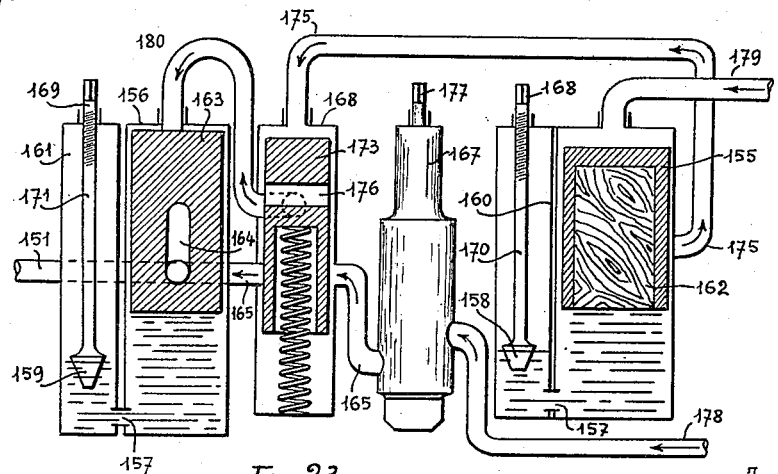
Figure 24:
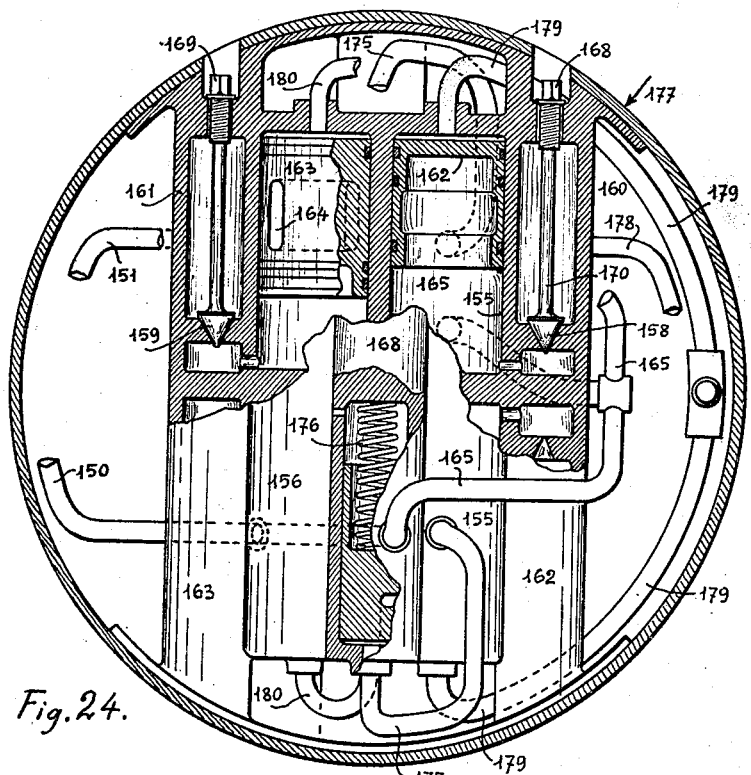
Figure 25:
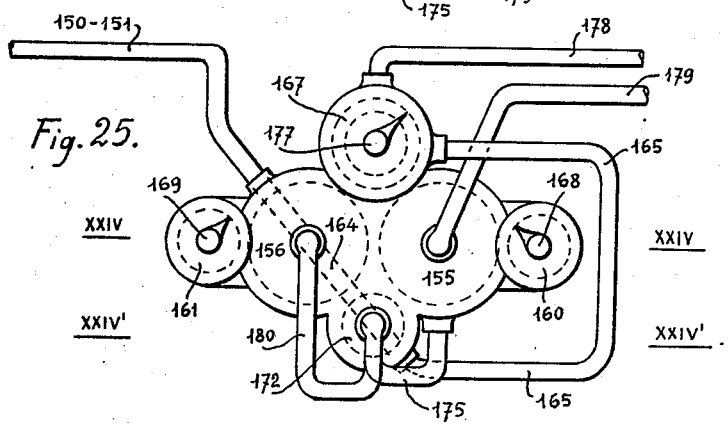

Fig. 17 shows diagrammatically, in horizontal axial section, the stern portion of a revolving torpedo, in the case in which the jets are only air jets, as said in the prior provisional specification; Fig. 18 shows a plan view in the case in which the jets are of water and air (a slight modification is in Fig. 18 moreover, in the disposition of the wings (143') reacting against the friction momentum, which would displace slightly the non-rotating wing owing to the dragging action of the torpedo body, said wings being placed toward the stern in Fig. 18 instead of towards the bow (143) (Fig. 17). Fig. 19 shows a transverse section on the line IXX—IXX of the Fig. 17; Fig. 20 shows a section on the line XX—XX of Fig. 17 and refers to the case in which the nozzles are ejector nozzles of water operated by air jets; Fig. 21 shows a longitudinal section of a steering wing with its compressed air jets; Fig. 22 shows a longitudinal section of a steering wing indicated in Fig. 21 with the alternative that it is provided with ejector nozzles with water jet (say with nozzles for water jets operated by air jets); Fig. 23 shows a scheme of the group of devices which compose similar controlling devices for the automatic adjustable operation of the steering wings; said Fig. 23 shows the union of the several devices between them, and with delivery pipes and distribution pipes for compressed air; Fig. 24 shows an example of the two devices for the automatic operation of the steering wings, the upper part being in section on the line XXIV—XXIV and the lower part in section on the line XXIV'—XXIV' of Fig. 25; Fig. 25 shows the same united of the devices of Fig. 24 shown in plan. Figs. 26 and 27 show, respectively, a vertical section like that illustrated in Figs. 19, 20 and its horizontal section on the line XXVII—XXVII of Fig. 26 for the embodiment in which the direction of the jets is toward the stern part of the torpedo and inclined to its axis; Fig. 28 shows an improved solution in order to be able, at will, to exclude from working one of the two wings, that is, to work successively twice the same wing (left or right) after a time interval, in which the torpedo has eventually run a rectilinear course. Figs. 29 and 30 show diagrammatically in plan view and in side view a gyroscope of the usual type and Fig. 31 shows diagrammatically in plan view the group of valves which are commanded by the gyroscope when its vertical axis is out of its regular position.

Referring to the construction illustrated in the drawings Figs. 1—17 it will be seen that the external form of the torpedo is more or less that of the usual naval torpedo, its length being variable according to the case its section circular, and its general shape cylindrical with tapering ends.

The conical nose is flattened, forming an opening 1, the boundary of which is normal to the course of the torpedo. The diameter of this opening is about one-third that of the torpedo.

The external casing or wall 2 is of steel sheet, completely watertight. At about one-seventh of its length from the forward end and about one-quarter of its length from the after end, the casing 2 is internally reinforced by spaced annular steel bulkhead members 3, 3; 4, 4 which serve to support the main air vessel 5 and the torpedo head 6 containing the explosive charge.

Annular water tanks 7 and 8 are located, respectively, between the bulkhead members 3, 3 and 4, 4 which tanks serve, as hereinafter more fully described, for balancing the torpedo and for regulating the depth of the submersion. Around the periphery of the forward bulkhead members 3, 3 are arranged holes 9 (Figs. 2 and 4) for the passage of the water which enters at the opening 1 in the nose. The forward wall only of the after members 4, 4 is provided with holes 10 (Fig. 3).

The main air vessel 5, which is cylindrical and of a diameter of about 5 centimetres (2 inches) less than the casing 2, is seated at each end in the inner bulkhead members 3, 4. The torpedo head 6 is sustained by the forward bulkhead member 3 and is coaxial with the casing and of a maximum diameter equal to that of the air vessel 5.

The construction is such that the cylindrical space 11 extending axially between the bulkhead members 3, 3 constitutes a watertight compartment closed at its forward end by the torpedo head 6 and at its after end by the forward end of the air vessel 5. Similarly, the cylindrical space 12 extending axially between the bulkhead members 4, 4 is hermetically closed at its forward end by the after end of the air vessel 5 and is open at its after end to the free space enclosed by the casing 2 as far as the extreme after end, forming therewith a second after watertight compartment 12'.

In the forward watertight compartment 11 is fitted a centrifugal governor 13 which, in co-operation with a hydrostatic plate 14, operates a small piston 15 to effect distribution of the compressed air, which if expelled through a series of nozzles 16 (Figs. 2 and 6), empties the tank 7 but if expelled through ejectors 17 effects filling of the tank 7 with water which enters through the valves 18 at the forward end; in this way variation of the weight of the forward water ballast is obtained (Figs. 2, 5 and 6).

A similar device is fitted within the after watertight compartment 12, 12' to control the water ballast in the after tank 8 (Figs. 3, 5 and 6); in Fig. 3 the after parts are indicated by the same reference numerals as the corresponding forward parts with the addition of the exponential 1.

The devices described are contrived to maintain the torpedo in horizontal position at the desired depth and will be more fully explained hereinafter.

In the after end of the after watertight compartment 12, 12' is an auxiliary compressed air vessel 19, smaller than the main air vessel 5. This vessel 19 is controlled by a hydrostatic cylinder 20 set for the maximum depth desired and supplies air for expelling water entering the passage 21 to cause the torpedo to rise to the surface again, when, during practice, the motive compressed air being exhausted, the torpedo would otherwise sink. The remaining space in this compartment is occupied by contrivances necessary for manœuvring the torpedo.

The construction of some of these contrivances is already known; in what follows only those of unusual construction and use will be described.

Inside the casing 2, between it and the head 6, the water tanks 7 and 8 and the main compressed air vessel 5, which are coaxially mounted and are of less diameter than said casing 2, is a passage 21 which, starting from the entrance opening 1, diminishes towards the maximum diameter of the head, increases between the forward bulkhead members 3, 3 diminishes again over the length of the main compressed air vessel 5, and increases again between the after bulkhead members 4, 4, terminating at the after wall of said after bulkhead members.

In the passage 21 between the members 3, 3 and the members 4, 4 are installed batteries of propulsion ejectors 22, 22'. These ejectors are submerged in the water with which the passage 21 is filled and a stream of air under high pressure forces the water tangentially to the periphery of the torpedo. The fore and aft batteries may be, as shown, disposed symmetrically, or, in the event of only two fore and two aft batteries being fitted, the batteries of each pair may be diametrically opposed, and the pairs angularly displaced about the torpedo axis.

The small auxiliary compressed air vessel 19 is coned in conformity with the conical shape of the casing 2 but is of less diameter and is supported coaxially with the casing by two annular spacing members 24, 25 perforated all around and fixed to the casing.

An intercepting device 26 (Fig. 14) is controlled by the hydrostatic cylinder 20 whereby to govern the passage of air from the air vessel 19 to the passage 21 by way of the two pipes 27 (Figs. 3, 7 and 14).

The exit nozzle of the air vessel 19 is fitted with a cock 28 interposed between the intercepting device 26 and the pipes 27 and operatively connected by means of an arm 73 and link 30 to one arm 72 of a register lever 29 adapted to be rocked as the torpedo is launched whereby to move the cock 28 into open position. The operation of this device will be more fully described hereinafter.

Between the spacing member 25 (Fig. 3) which serves as a bulkhead and the extreme after end of the casing is a small space 31.

In the centre of the bulkhead 25 is fitted a small conical non-return valve 32 opening inwardly to the said space 31.

The propeller 33 is fixedly mounted on the casing; an axial hole 34 in the propeller boss affords communication between the space 31 and the sea. The object of the small valve 32 is to permit escape of air or gas from the after compartment 12, 12' when the internal pressure in said compartment exceeds the external water pressure on the valve 32. The presence of such air or gas within the compartment 12, 12' may be due to air leakage or to gas leakage from the air heating device 40 (Fig. 7) which may have to develop gases in its functioning.

When the torpedo is launched it becomes immersed and water flows into the passage 21, entering at the nose opening 1 without meeting any resistance, since the air expelled on the entrance of the water escapes freely through the cones of the propulsion ejectors 22, 22'.

At the moment of launching, the register lever 29 opens concomitantly with the cock 28 a valve to be hereinafter described which permits compressed air from the main air vessel 5 to come into action by way of a pipe (Fig. 7).

A device 35 called a retarder, illustrated in Figs. 3, 7, 11 and 12 situated aft in the watertight compartment 12' in one with the speed regulator, retards the passage of air from the air vessel 7 to the propulsion ejectors 22, 22' for a sufficient time after launching to allow the torpedo to submerge and assume its normal position. This device will be fully explained hereinafter.

From a pipe 36 (Fig. 7) which conducts the compressed air from a pressure reducer 55 to the retarder 35 a branch pipe 37 conveys compressed air direct to distributing devices 38, 38' which control the admission of water ballast into the two tanks 7, 8; and, since the centrifugal governors 13, 13' do not operate until the torpedo commences to rotate, compressed air from the air vessel 5 enters the tanks 7, 8 through the nozzles 16, 16' and prevents water from entering.

The torpedo so balanced is buoyant; therefore, as soon as it is in the water, it comes up to the surface in a horizontal position.

The retarder 35 now permits air from the air vessel 5 to pass through the heater 40, and the pipes 41, 42, 42', 43, 43', 44 and 44', to the batteries of propulsion ejectors 22, 22'; the torpedo reacting receives a rotary movement in the direction opposite to the direction of the jets of water from the ejectors. The torpedo rotating, the propeller rotates also, imparting axial thrust and the torpedo starts on its course. The rotating mass of the torpedo function as a gyroscope and the torpedo therefore does not deviate from its rectilinear course.

With the rotation of the torpedo the centrifugal governors 13, 13' commence to operate, and by means of transmission levers 45, 45' (Figs. 2, 3, 7 and 13) slide the slide valves 15, 15' so that the compressed air, instead of passing through the nozzles 16, 16' as before, passes now to the ejectors 17, 17' whereby to effect suction of water through the valves 18, 18' and the consequent filling of the tanks. In this way the torpedo is weighted and tends to sink. When it arrives at the depth for which the hydrostatic plates 14, 14' are adjusted, these latter, yielding to the water pressure and operating through the transmission levers 46 (Fig. 13) which magnify the movement of said plates, cause the slide valves 47, 47' (Figs. 7 and 13) to act to allow the passage of the compressed air from the pipes 48, 48' (Figs. 7 and 13) through the pipes 49, 49' to the cylinders 50, 50'. The pistons of said cylinders are forced by the action of the compressed air in opposition to recoil spring 51, 51' (Fig. 13) of the centrifugal governors 13, 13' which now act to cut off the air supply to the ejectors 17, 17' and distribute it again to the nozzles 16, 16' whereby to empty the tanks 7, 8. As the torpedo rises, the plates 14, 14' and the valves 47, 47' return to normal position, the air which has passed into the cylinders 50, 50' expands in the exhaust pipes 52, 52' and the governors 13, 13' start operating again; this alternate admission to and expulsion of water from the tanks results in maintaining the torpedo at a constant mean depth.

Should the torpedo for any reason incline by the head, or vice versa, the hydrostatic plate at the greater depth will come into action and the horizontal position will be immediately re-established.

Figs. 8, 9 and 10 show inter alia the valve which is opened concomitantly with the cock 28 by the register lever 29 as the torpedo is launched. Opening of said valve permits air from the main air vessel 5 to the pipe 54 (Fig. 7) to the pressure reducer 55 and to pass from the latter under reduced pressure to the retarder 35 by way of the pipe 36.

Branching from the pipe 36 is a pipe 37 of smaller diameter which carries the compressed air directly to the distributing devices 38, 38' which are, under the present conditions, in communication with the tank emptying nozzles 16, 16'.

From the retarder 35 air passes through the pipe 39 to the heater 40 and thence to the main pipes 41, 42, 42', 43, 43', 44, 44' which feed the propulsion ejector batteries 22, 22'.

A pipe 48, 48' conducts air to the slide valves 47, 47' of the hydrostatic device. Other two branch pipes 56, 57 conduct air to oil and water receptacles 58, 59, respectively (Fig. 7).

The oil forced by the air through the pipes 60 goes to lubricate the slide valves 15, 15', 47, 47', 61 (Fig. 7) as also the governor pistons 50, 50' and the piston of the intercepting device 26 of the auxiliary air vessel 19. To regulate the angular velocity of the torpedo and consequently its speed a cock 62 (Figs. 11 and 12) is fitted to the retarder 35, which intercepts air entering through the pipe 36 which is normally open. Secured to said cock is an arm 63 carrying at its free end a weight 64 and influenced by a spring 65 which maintains the cock in open position and the stress of which can be adjusted from the exterior of the torpedo.

Up to a given angular velocity of the torpedo the weight 64 influenced by centrifugal force, cannot overcome the pressure of the spring 65 but, on the velocity exceeding the predetermined amount, increase of centrifugal force causes the weight 64 to overcome the pressure of the spring 65 whereby partly to rotate the cock 62 to effect throttling of the air passage.

Consequently, the air discharge from the propulsion ejectors 22, 22′ is diminished and the speed of rotation of the torpedo is reduced.

The air heating device 40 may be of any type adapted to raise the temperature of the compressed air at the moment of expansion.

With reference to Figs. 8, 9 and 10 it will be seen that the illustrated device, like those commonly used, comprises a casing 31 containing a valve 66 for refilling the main air vessel 5, the differential piston 75, which controls the air supply through the pipe 54 in the pressure reducer 55, and the needle valve 69, regulatable from the outside, which together constitute the distance regulator. When the register lever 29 is rocked as the torpedo leaves the tube, the valve 67 is opened through a train including a link 70 and a balance lever 71. The arm 72 of the lever 29 opens, concomitantly with the opening of the valve 67, the cock 28 of the auxiliary air vessel 19 through the intermediary of the link 30 and the lever 73. The register lever 29 is fulcrumed at 74 and is operatively connected to the valve 67 and the piston 75 by the link 70 and the balance lever 71; in this way the valve 67 is lifted when the lever 29 is rocked so that air is passed from the air vessel 5 by way of the pipe 127, the branch 76, the branch 54′, to the retarder 35 by way of the pipe 54, reducer 55 and pipe 36. The free space in the cylinder 68 above the piston 75 is full of thick oil which is poured in through the plugged aperture 77. Said space communicated with a space 78 by way of a passage 79. A screw-threaded needle valve 69 regulatable from the exterior of the torpedo controls communication between the space 78 and a port 81. The underside of the cylinder 68, beneath the piston 75, communicates with the valve chamber 80 under the valve 67 by way of a passage 79′, the arrangement being such that, when the valve 67 is open, pressure is built up under the piston 75 whereby said piston is moved upwardly. If the needle valve 69 is completely closed, oil cannot escape from the top side of the piston 75 and the piston is immovable. If the valve 69 is more or less open, the oil is ejected from the port 81 at a pre-arranged rate, dependent on the size of the passageway. The link 70 connected to the register lever 29 becomes immovable and the balance lever 71 is raised to its maximum height by the piston 75, step by step, as the oil makes its exit; the pivot 71′ of the link 70 acting as a fulcrum for the lever 71, the valve 67 descends and closes the space 80 thereby cutting off the supply of compressed air from the main air vessel 5 so that the torpedo then stops.

With reference to Figs. 11 and 12, it will be understood that the device for sinking the torpedo when, having failed to hit its mark, it stops through lack of energy, whilst necessary in war, is not necessary during practice; said device being rendered inoperative by manipulation of the pin 82. Neither the principle nor the construction of this latter device is in itself new; therefore a detailed description is not given.

Attention is, however, called to the retarder 35. A cylinder 83 is provided at its lower end with a valve-controlled port 84 opening into a space 85 serving as a discharge space for oil. A piston 86 is adapted to be moved under control in the cylinder 83 and may be removed therefrom by unscrewing a plug 87 on the exterior of the torpedo. The port 84 is controllable by a valve 88 regulatable from the exterior of the torpedo.

The working of this device is as follows:—

The valve 88 is closed, the plug 87 removed and the piston 86 extracted; oil is poured into the cylinder 83 almost up to the level of the branch 89 which is connected to the pipe 39 (Fig. 7). On the piston being replaced it remains in raised position, resting upon the oil, the air displaced by the piston on entering the cylinder passing out by way of the branch 89. The plug 87 is screwed home and the valve 88 is adjusted with reference to a graduated washer on the exterior of the torpedo.

Adjustment of the valve 88 controls the effective area of the port 84 providing communication between the cylinder 83 and the space 85.

When the register lever 29 opens the valve 67, the compressed air, after having passed through the pressure reducer 55 passes by way of the pipe 36 (Fig. 7) to the branch 90, and acts on the top of the piston 86 forcing it downwardly. The oil beneath the piston 86 is forced into the space 85 by way of the port 84, the air contained in said space escaping by way of a permanently open aperture 91. When the piston 86 has reached the bottom of the cylinder 83, all the oil having passed into the space 85, communication is established between the branches 90 and 89.

The air now passes by way of the pipe 39 to the air heater 40 and thence to the propulsion ejector batteries 22, 22′ by way of the pipes 41, 42, 42′, 43, 43′, 44, 44′ and by way of the pipes 48, 48′ to the hydrostatic devices 14, 14′ (Figs. 7 and 15).

The time interval which elapses before communication is established between the branches 90 and 89 of the retarder 35 is of course dependent on the rate of flow of oil through the port 84, which rate is dependent on the adjustment of the valve 88.

It will thus be understood that the period which elapses between the launching of the torpedo and the admission of compressed air to the propulsion ejectors 22, 22' is dependent on the adjustment of the valve 88 which is regulatable from the exterior of the torpedo.

The branch 90 (Fig. 11) is equipped with a cock 62 which is normally in open position and is operable as already explained to govern the speed of the torpedo by the lever 63 carrying the weight 64.

With reference to Fig. 13, the functions of the annular tanks 7, 8 (Figs. 2 and 3) having already been described, it is only necessary to describe the construction and working of the centrifugal governors 13, 13' and hydrostatic plates 14, 14'. As previously indicated, there are two of these contrivances, one forward and one aft.

Considering the forward contrivance (Fig. 13), it will be noted that the weights of the governor 13 are pivoted to a support 92 fixed to the body of the torpedo; the governor thus rotating at the same velocity as the torpedo itself. A spring 51 reacts lightly upon the radial movement outwards of the weights; therefore, as soon as the torpedo commences to rotate, the governors begin to act.

Outward movement of the weights effects, through a train of levers 45, withdrawal of a small piston 15 constituting a slide valve movable in a casing 94. With the governor in inoperative position, compressed air from the pipe 37 passes to the nozzles 16, but, as the piston 15 is retracted by the weights, this air is switched over to the ejector nozzles 17. When the torpedo is in action at full speed with the governor full open, it may happen that it is at too great a depth and that it is necessary to stop the action of the ejector nozzles 17 and to bring the nozzles 16 into action to lighten the torpedo and cause it to rise. In this case the hydrostatic plate 14 comes into operation.

The casing containing the diaphragm or plate 14 is in communication with the sea by way of an aperture 96. Pressure of a spring 97 on the plate 14 is regulatable from the exterior of the torpedo by means of a nut 98 and gearing 99, adjustment of this nut determining the maximum depth to which the torpedo will sink.

When the pressure of the water overcomes that of the spring 97, the plate 14 yields, pushes the rod 100 and puts the set of multiplying levers 46 into action whereby to effect sliding movement of the small piston 47 of the slide valve 101 and to switch compressed air delivered by the pipe 48 into communication with a pipe 49 which discharges into the cylinder 50 of the regulating apparatus in which is a piston associated with the spring 51 which reacts against the governor weights 13.

The compressed air actuates said piston to influence the governor whereby the small piston 15 of the slide valve 94 is caused to recede and to re-establish communication between the pipe 37 and the nozzles 16 and the liquid ballast of the annular tank 7 is expelled.

The device illustrated in Fig. 14 permits passage of compressed air from the auxiliary air vessel 19 when, the air in the main vessel 5 being exhausted, the torpedo would tend to sink. This device constitutes a means of avoiding loss of the torpedo and also prevents the torpedo from sinking to a greater depth than is desired. A pipe 102 connected to the cock 28 branched in two or more directions, the branches 27 passing through the after bulkhead 4 into the passage 21 (Figs. 2, 3) which communicated by way of the valves 18, 18' with the annular tanks 7, 8. Between said pipe 102 and the chamber 19 is interposed the intercepting device 26.

When the torpedo is not in action, the cock 28 is closed but is opened as already explained at the moment of launching by the register lever 29 acting through the link 30. Compressed air from the main air vessel 5 (within an interval of a few seconds) passes by way of a pipe 103 (Figs. 7 and 14) supplied from the pipe 36, direct to the slide valve 61 of the hydrostatic apparatus 20 and thence by way of a pipe 104 into the cylinder 26 of the intercepting device. The air pressure overcoming the pressure of the spring 106, depresses the piston 105 against a stop to the position shown in Fig. 14 whereby to cut off the exit of air from the air vessel 19, the piston 105 functioning as a closing member. So long as the air pressure above the piston 105 overcomes the spring 106, the piston remains in depressed position and compressed air in the air vessel 19 cannot escape. If the torpedo sinks too low, the hydrostatic apparatus 20 functions in the manner previously described whereby to move the slide valve 61 so that the air supply pipe 103 is masked and the pipe 104 put into communication with the discharge pipe 108 thus permitting the piston 105, under the influence of the spring 106, to unmask the exit nozzles of the air vessel 19. Air is now discharged by way of the pipe 27 into the passage 21 whereby to effect lightening of the torpedo and to cause it to rise to the surface. Again, if the main air vessel 5 becomes exhausted the piston 105 rises and opens the exit nozzle of the air vessel 19 as before, causing the torpedo to rise to the surface.

During the few seconds which pass between the opening of the cock 28 and the arrival of the air from the main vessel 5 there is naturally a slight escape of air from the auxiliary air vessel 19, but this is partially useful as such air passes into the passage 21 and prevents, at first, the entrance of the water, which is necessary to allow the torpedo to get into equilibrium.

Referring to Fig. 15 it will be seen that as the head carrying the explosive charge is retracted into the forward end of the torpedo there is provided an improved form of striker adapted to function with certainty, taking into consideration the conditions imposed by the net cutter hereinafter described.

The upper half of Fig. 15 shows the striker in operative position with the percussion rod detained; the lower half shows it ready for action.

While at rest the two centrifugal weights 109 are close together and in this position are held in place by the springs 110, projections 111 one on each weight 109 entering a groove 112 in the percussion pin 113 and detaining it. The sleeve 114 which is slidable on the percussion pin 113 is urged by a spring 115 against the retaining projections 111. As soon as the torpedo commences to rotate, the two weights 109, pivoted at 116 are thrown out by centrifugal force as indicated at 109', the sleeve 114 is freed and, being thrust by the spring 115, moves as indicated at 114' and closed the openings 117 through which the retaining projections 111 projected.

The percussion pin 113 is now free except for the action of springs 120 entering slots 119 in the pipe 118. If the torpedo impacts abruptly a rigid body, the percussion pin 113, acting by inertia, overcomes the drag of the springs 120 and strikes the percussion cap 121. If the blow is soft such as when the torpedo strikes a net, the percussion pin does not move being detained by the springs 120.

122 denotes the percussion cap; 123 the casing protecting the centrifugal weights, and rotatable to unscrew it and move it away to allow the weights to be moved together again to lock the percussion pin 113 in retracted position. 124 is the closing plug by opening which the percussion pin is first introduced.

With special reference to Fig. 16 it will be observed that since the torpedo rotates about its own axis during its travel, its movement offers facilities for cutting torpedo nets which are customarily used in war time as a protection against torpedoes.

In fact, if at the nose, around the conical casing 2 a band 125 in the form of a saw is wound helically, extending as far as the maximum diameter, or if the nose is grooved in the form of a milling cutter 126, it will result that upon the torpedo coming into contact with a net it will cut its way through and continue its course.

With special reference to the solution illustrated, as an example we see that the steering system comprises two devices or parts, one, for maintaining the pipes, which direct the compressed air jets, constantly upon the horizontal plane notwithstanding the rotation of the torpedo, (the said device or part having to be eliminated for simplicity of the whole, if the rudder-device is applied to a torpedo of the usual type) and the second device or part, is composed of an assemblage of regulatable devices either to regulate the periods and the duration of operation of each steering wing, or for adjusting the intensity of the operation with reference to the peculiar conditions and objects which, case after case, will present.

Referring to the accompanying drawings, 127 (Figs. 17—20) denotes a truncated conical ring defining five annular chambers 128, 129, 130, 131, 132 (Fig. 21). The ends of the ring form seats 133, 134 engaging bearings 135, 136 mounted on seats 137, 138 on the torpedo case around which the ring 127 is free to rotate. The clearance between the internal surface of the ring 12, and the torpedo case is just sufficient to hold a thin layer of grease. Radially disposed around the periphery of the ring 127 at intervals of 90° are four hollow wings 139, 140, 141, 142 (Figs. 19 and 20). The wing 139 is empty and is airtight. The wing 140 is filled with heavy material e. g. lead. The wings 141 and 142 are unfilled and are airtight, each having internally a pipe for compressed air which bifurcates towards the outer end of the wing and terminate with one or more nozzles opening outwardly. The inner end of the pipe in the wing 141 (Fig. 21) communicates with the chamber 131 and the inner end of the pipe. The wing 142 communicates with the chamber 129 (Fig. 17).

From the described arrangement of the four wings it will be evident that the two wings 139 and 140 will be continuously disposed vertically, i. e. the wing 139, which is empty, will be located above, and the wing 140, being filled with heavy material, will be located below. It follows that the two wings 141 and 142 (hereinafter referred to as steering wings) will be continuously disposed horizontally. During immersion, the wing 139 and partially also the steering wings, which latter have positive thrust, the wing 139 having a strong negative thrust, provide for better horizontal position of the steering wings.

The great angular speed which the torpedo may attain may cause friction which will cause the ring, if not to rotate, as its rotation is prevented by the four wings, to incline towards the direction of rotation of the torpedo; To prevent this, in front (Fig. 17), or at the rear (Fig. 18) of each of the four wings are fitted adjustable blades 143 or 143', which, being inclined in the proper manner so as to prevent the rotation of the ring, will function during the run of the torpedo, due to the action of the water encountered at a given angle, as would do the blades of a turbine, thereby contributing to maintain the ring angularly immovable in the proper position.

The distributing chambers 129 and 130 (Figs. 21 and 22) have annular ports, 145, respectively co-operating with aperture ports 146, 147 opening from the annular chambers 148, 149 respectively, formed in the torpedo body at the level of the external surface of the torpedo casing. Assuming that the chamber 129 is connected to the left-hand steering wing, the chamber 131 is connected to the right-hand steering wing and, if the chamber 148 is connected by way of a pipe 150 to one of the devices to be hereinafter described, the chamber 149 will be connected to another similar device, by way of a pipe 151. When compressed air is passed from one or other of the devices, say from that device connected to the pipe 151, the air passes from the chamber 149 (Figs. 21 and 22) into the chamber 131 of the ring and hence into the right-hand steering wing 141. Conversely, if compressed air is passed from the other device through the pipe 150 connected to the chamber 148, this air passes to the left-hand steering wing 142 through the chamber 129.

During the whole time of delivery of compressed air from, for instance, the right-hand steering wing 141 the stern of the torpedo will be pushed towards the left-hand so that the torpedo will draw near the right-hand whilst, if the compressed air is delivered from the left-hand steering wing 142 the converse will happen.

In order to prevent escape of compressed air from the space between the torpedo body and the ring, and between the chambers, there is provided between the chambers 148, 129 and 149, 131 the annular chamber 130 formed half in the torpedo body and half in the ring, and the chambers 128, 132 spaced one on each side of the chamber 130 and similarly formed (Figs. 21, 22); the chambers 128, 130, 132 are filled with heavy grease which the compressed air is unable to expel. During the brief duration of the run of the torpedo this grease, without causing undue resistance, serves very satisfactorily as packing to effect water seal and to maintain lubricated the internal surface of the ring.

The reaction thrust on the stern of the torpedo on exit of compressed air from a steering wing may be considerably increased by fitting ejector nozzles 154 (Fig. 22) similar to those already described for effecting rotation of the torpedo, in place of simple nozzles providing for direct exit of the air as shown in Fig. 21.

An embodiment of steering wing with ejectors is shown in Figs. 18 and 22. Water enters the mouth 152 freely with the speed of the torpedo and passes along the pipe 153 enclosed in the steering wing, wherefrom, under the influence of air issuing from the nozzles 154, it is ejected with great force and causes a thrust by reaction on the stern of the torpedo, which consequently causes the torpedo to approach that side, with a greater speed and force than by a jet of air only.

Additional apparatus, completing the system, and serving to distribute compressed air to one or other of the two steering wings at the moment and for the duration of time required, comprises two groups of similar devices. It will therefore be sufficient to describe one of them.

Fig. 23 shows diagrammatically, a group of these devices connected to each other. Similar cylinders 155, 156 communicate, by way of ports 157, with smaller cylinders 160, 161. 158 and 159 denote valves located, respectively, in the cylinders 160 and 161. The capacities of the cylinders 160 and 161 are equal to the capacities of the respective cylinders 155, 156 calculated under the pistons when these are brought completely upwards. The cylinders 155 and 156 are provided with pistons 162, 163 respectively, the construction of which is however different. Piston 162 is simple and of usual construction, it may be hollow for lightness and it is fitted with elastic bands. Piston 163 on the other hand is formed with a diametral elongated slot 164 of such a length that, when the piston has reached the bottom, the upper end of this opening has already overstepped the openings of the pipes 165, 151 thus stop, as a valve, the communication between these two pipes and the passage of compressed air arriving from the pipe 165 and from the special pressure regulator 167.

This piston also will be provided with elastic bands. The leading pipe 151 leads the compressed air to one of the steering wings. The two cylinders 160, 161 conjoined with the aforesaid cylinders work as valves. By unscrewing the screw registers 168, 169 the valves 158 and 159 carried by the rods 170 and 171 are gradually withdrawn from their seats and liquid which lies under the pistons, passes into the cylinders 160, 161 respectively, taking for this a time the duration of which depends upon the degree of lift of the valves from their seats and proportionately with the pressure exercised upon the respective piston.

A graduated index under the screws 169–168 will indicate the degree of the opening of such valves. The cylinder 172, provided with a piston 173 held in normal position by a spring 174 which yields when the piston is pushed by the compressed air arriving from the pipe 175 has the function of a sliding valve serving to connect, when entering into action, the special pressure reducer 167, (we call said reducer "special reducer" in order to distinguish it from the pressure reducer 67 already described for the torpedo) serves also to reduce to the desired degree the compressed air arriving from the main tank and necessary to operate the steering wings independently from the pressure reduced by the main reducer. It can also be adjusted by means of the adjusting nut 177. Air arrives at high pressure from the main tank 5 (of previous provisional specification) through the pipe 178 which is connected to the admission pipe 66 before the main pressure reducer 67 and goes directly to this special reducer. On the other hand, through the pipe 179 arrives air from the main reducer 67 as soon as the adjusting lever 29 of the torpedo is rocked at the moment of launching and it acts upon the piston 162 of the cylinder 155. The pipe 175 connects the cylinder 155 to the cylinder 172 and, when the piston 162 has reached the bottom of the cylinder 155, compressed air arriving from the pipe 179 passes from the pipe 175 to act upon the piston 173 of the cylinder 172 and, when the piston 173 under the pressure of compressed air driving from the pipe 175 has reached the bottom of the cylinder 172 the pipe 175 will be in communication with the conduit 180 and compressed air goes to press upon the head of the piston 163 of the cylinder 156. Simultaneously the slot 176 of the piston 173 puts into communication, by means of the pipe 165, the special reducer with the opening of the cylinder 156 which corresponds with the opening slot 164 of the piston 163 so that compressed air arriving from the special reducer passes directly to the steering wing through the pipe 166. What has been said in connection with Fig. 23 applies also to Figs. 24 and 25; Fig. 2′ represents the whole of the devices like those described, shown in a single block. the upper device being shown in section on the line XXIV—XXIV Fig. 25. The lower group is illustrated in section on the line XXIV′—XXIV′ of Fig. 25; Fig. 25 is a plan view.

Fig. 28 illustrates a further improvement to the device for feeding compressed air to the steering wings. In the device as illustrated in Figs. 23 to 25 each device as per Fig. 25 is designed to feed its (the left-hand or the right-hand) steering wing. According to Fig. 28, on the contrary, each device according to Fig. 23 can be predisposed to feed the left-hand or the right-hand steering wing. 181 and 182 are two groups each according to Fig. 23; 183 and 184 are two pipes each as 151 in Fig. 23, 185, 186 are two special cocks and 187 a pipe connecting said cocks, (150, 151 are the same pipes as illustrated in Fig. 17). If the cock 185, for instance is disposed in such a manner as to permit only the passage of compressed air according to the arrow 188, and the cock is disposed in such a manner as to permit the passage of compressed air both in the direction of the arrow 189 (when the compressed air comes from the device 182) and in the direction of the arrow 190 (when the compressed air comes from the device 181) the two devices 181 and 182 will successively act twice on the same steering wing.

Referring particularly to Figs. 26, 27 we note that the wings are predisposed in such a manner as to permit that the compressed air jets have an inclined direction relatively to the torpedo axis so that the pressure of the jets is directed towards the stern of the torpedo and near to the tangent of its path, with the purpose of avoiding a displacement of the torpedo parallel to its axis (viz: in a direction perpendicular to its axis). The torpedo is fitted with a gyroscopic device and with a stop (not illustrated) which at the moment of being launched blocks the group of the four wings on the body of the torpedo which will be obliged to dispose itself with the heavy wing in a vertical plane, that with the vertical axis of the gyroscope in a vertical plane. The torpedo may however receive rotations around the vertical axis passing through its center of gravity.

The gyroscopic device illustrated in the Figs. 29 to 31 is destined to cause the torpedo in such a case to return to its regular direction before it starts its active movements. The gyroscopic device is roughly illustrated in 228 in Fig. 1.

Referring now particularly to the device illustrated in Figs. 29 to 31, 191, 192 the cardanic suspension of the gyroscope; 191 is vertical and 192 horizontal; said gyroscope is charged by means of a spring 193 fixed at its lower end to a fixed point and above to the clock-member 194 fitted with the bevelled gear 195 which meshes with the sector bevel-gear 196 carried by the axis of the gyroscope. The spring is loaded from the exterior by means of a key and shaped end 197. When the torpedo is launched the lever (29) becomes lowered and by means of the rod 198 and lever 199 opens the cock 200 in this manner allowing the compressed air of a bottle 201 to pass along the pipe 202 and reach the cylinder 203; said compressed air pushes, towards the left, the piston 204 allowing in this way the passage of the compressed air along the pipe 205 as far as the cylindrical housing 206 which comprises a rotating valve 207 carried by the vertical shaft 191 of the gyroscope.

Said valve is constituted by a cylindrical body the diameter of which is smaller than the internal diameter of the housing 206 and carries two opposite projections 208 and 209 for the purpose of closing the passage ways of the connections of the pipes 210 and 211 to the housing 206. Said pipes 210 and 211 are, at their other end, connected to the housing 212 of a double sliding valve constituted by two pistons 213—214 between which the spring 215 is interposed which tend to reciprocally detach themselves from each other; each piston is fitted with a circular groove 213'—214'; the housing presents a conduit 216 and the attachments for the two pipes 217 and 218 respectively connected to the pipes 150 and 151 of the Fig. 17. Another pipe 219 is connected to the cylindrical housing 220 containing a piston slide valve 221 which it forces upwards alt by a spring 222. Said piston 221 is fitted with a groove 221' and the housing 220 is connected with the pipes 223 and 224, the pipe 223 is connected with the pipe 54 of Fig. 3 and the pipe 226 is connected to the pipe 225 which is attached to the bottom of the housing 204 and is connected to the pressure reducer 55 (Fig. 3). The working of said device is as follows: Presuming that the torpedo, when entering the water or when upon returning to the surface, becomes deviated from its desired course the retarder during this time maintains the ejectors inactive. At the moment of launching the lever 29 opens the cock 200 and allows the compressed air to pass into the housing 206. If the torpedo has maintained its regular position the projections 208 and 209 close the openings of the pipes 210 and 211 but if the torpedo has been deviated, the valve 207 rotates slightly in correspondence with the deviation of the torpedo. Let us assume that said rotation is in the direction of the arrow 225. The compressed air coming from 205 will penetrate into the pipe 210 and will push back the piston 213 until the groove 213' puts the pipe 223 into communication with the pipe 217 through 221'—219—216—213'; the compressed air coming from the pipe 41 will pass into the pipe 217 and successively into the pipe 150 putting the steering wing into action which will impart rotation to the torpedo so as to cause it to return into its regular position. During said rotation the body 207 will rotate in the opposite direction of the arrow 225 and the projections 208—209 will return to close the openings of the pipes 210—211 cutting out the device 212—213—214, at the same time the compressed air passing from the pipe 41 along the pipes 224 and 225 closed the cylinder-valves 204 and 221 cutting out the whole device. A similar but opposite working of the device will take place if the torpedo should deviate in the opposite direction. 226 is a discharge pipe which allows the cylindrical body 207 to again assume its position as illustrated in Fig. 31.

The device illustrated in the Figs. 29 to 31 works for a short time at the beginning of the launching; after which the retarder will allow, as aforesaid, the freeing of the stop which holds the four wings adherent to the body of the torpedo and the passage of the compressed air to the ejectors and the torpedo will begin to rotate and move, starting in the exact desired direction the torpedo is also fitted with a rib 217 (Fig. 1) which, engaging in a corresponding longitudinal groove inside of the tube ensure the exact position of the torpedo during the launching.

Having now particularly described and ascertained the nature of my said invention and in what manner the same is to be performed, I declare that what I claim is:

1. A locomotive torpedo including a body, a propeller connected with and forming a unit with said body, and means for directing jets of fluid from said body in planes substantially normal to the axis of the body to produce rotary movement of the latter whereby the propeller imparts an axial thrust to the torpedo.

2. A torpedo as claimed in claim 1, characterized in that the fluid directing means is constituted by ejector nozzles for discharging water jets from the body.

3. A torpedo as claimed in claim 1, characterized in that the nose of the body is provided with an opening for the admission of water and a chamber for pressure fluid within the torpedo for ejecting water admitted to the opening through the fluid directing means.

4. A locomotive torpedo including a body, a rigid propeller carried by the body and forming a unit therewith, ejector nozzles arranged to direct fluid jets from the body in planes substantially normal to the axis of the latter to effect rotary movement of the body, and a chamber for pressure fluid for ejecting fluid through the ejecting nozzles.

5. A torpedo as claimed in claim 4, characterized by the provision of an opening in the nose of the body for admitting the water thereto, and means for conducting water admitted through said opening to the nozzles.

6. A torpedo as claimed in claim 4, characterized by the provision of an opening in the nose of the body for admitting the water thereto, and means for conducting water admitted through said opening to the nozzles, said opening being in free communication with an internal space through which the water admitted is freely accessible to the nozzles.

7. A torpedo as claimed in claim 4, characterized in that the ejector nozzles are arranged about the periphery of the body.

8. A torpedo as claimed in claim 1, characterized by the provision of two spaced water tanks, one adjacent to the nose and the other adjacent to the rear end, and hydrostatic plates subject to the pressure of the exterior water and operating to control the tanks whereby to maintain the axis of the torpedo horizontal and to control the depth of submersion.

9. A torpedo as claimed in claim 1, characterized by the provision of means for regulating the distance travelled and including a device working in accordance with the time required by a quantity of oil to pass through a throttled passage.

10. A torpedo as claimed in claim 4, characterized by the provision of an opening in the torpedo body for admitting water for ejection through the ejector nozzles, and auxiliary compressed air tank to prevent the water initially entering the internal space until the torpedo returns to the surface to prevent the torpedo from sinking below a certain depth and further to lighten the torpedo when the latter has become inactive.

LUIGI ARNALDO SACCO.